United States Patent
Miwa et al.

(10) Patent No.: US 9,465,675 B2
(45) Date of Patent: Oct. 11, 2016

(54) COMMUNICATION CONTROL DEVICE, INFORMATION PROCESSING APPARATUS, PARALLEL COMPUTER SYSTEM, AND CONTROL METHOD FOR PARALLEL COMPUTER SYSTEM

(71) Applicant: FUJITSU LIMITED, Kawasaki-shi, Kanagawa (JP)

(72) Inventors: Hideki Miwa, Kawasaki (JP); Ikuo Miyoshi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 14/538,846

(22) Filed: Nov. 12, 2014

(65) Prior Publication Data

US 2015/0154058 A1    Jun. 4, 2015

(30) Foreign Application Priority Data

Nov. 29, 2013  (JP) .................................. 2013-248579

(51) Int. Cl.
*G06F 9/54* (2006.01)
*G06F 11/34* (2006.01)

(52) U.S. Cl.
CPC ................. *G06F 9/54* (2013.01); *G06F 9/546* (2013.01); *G06F 11/3404* (2013.01); *G06F 11/3423* (2013.01); *G06F 11/3476* (2013.01)

(58) Field of Classification Search
CPC ...... G06F 9/54; G06F 9/546; G06F 11/3423; G06F 11/3404; G06F 11/3476
See application file for complete search history.

(56) References Cited

U.S. PATENT DOCUMENTS

| 5,903,730 | A | | 5/1999 | Asai et al. | |
|---|---|---|---|---|---|
| 5,928,351 | A | * | 7/1999 | Horie | ........................ G06F 9/52 712/11 |
| 7,100,021 | B1 | * | 8/2006 | Marshall | ................... G06F 9/52 712/19 |
| 2008/0077921 | A1 | * | 3/2008 | Chaudhary | ............... G06F 9/52 718/100 |
| 2009/0193228 | A1 | * | 7/2009 | Kasahara | ................ G06F 15/16 712/29 |
| 2010/0124241 | A1 | | 5/2010 | Hiramoto et al. | |
| 2011/0131425 | A1 | | 6/2011 | Banerjee et al. | |
| 2012/0054722 | A1 | | 3/2012 | Takeda et al. | |

FOREIGN PATENT DOCUMENTS

| EP | 2466485 A1 | 6/2012 |
|---|---|---|
| JP | 2010-122848 | 6/2010 |
| WO | 2012/095762 A1 | 7/2012 |

OTHER PUBLICATIONS

Pang Zhengbin, Hardware Acceleration of Barrier Communication for large scale parallel computer, Nov. 14, 2013. pp. 1-5.*
Extended European Search Report mailed on May 23, 2016 for corresponding European Patent Application No. 14193404.2, 8 pages.

* cited by examiner

*Primary Examiner* — Syed Roni
(74) *Attorney, Agent, or Firm* — Fujitsu Patent Center (57) ABSTRACT

An arithmetic processing device executes a program, and gives first sequence information to a first start time when a first process included in the program starts a first interprocess communication. Then, the first start time and the first sequence information are written in a main storage device. When second sequence information given to a second start time when a second process starts a second interprocess communication is newer than the first sequence information, an operational circuit in a communication control device does not carry out an operation using the first start time. On the other hand, when the second sequence information corresponds to the first sequence information, the operational circuit carries out an operation using the first start time and the second start time and outputs the operation result.

9 Claims, 10 Drawing Sheets

RELATED ART

COMMUNICATION CONTROL DEVICE, INFORMATION PROCESSING APPARATUS, PARALLEL COMPUTER SYSTEM, AND CONTROL METHOD FOR PARALLEL COMPUTER SYSTEM

CROSS-REFERENCE TO RELATED APPLICATION

This application is based upon and claims the benefit of priority of the prior Japanese Patent Application No. 2013-248579, filed on Nov. 29, 2013, the entire contents of which are incorporated herein by reference.

FIELD

The embodiments discussed herein are related to a communication control device, an information processing apparatus, a parallel computer system, and a control method for a parallel computer system.

BACKGROUND

In executing a parallel application program in a parallel computer system, processing is carried out in parallel while each of a plurality of processes repeat arithmetic processing and interprocess communication processing, mainly using a Message Passing Interface (MPI). This interprocess communication processing is executed between processes in a node of the parallel computer system, and is also executed between processes of different nodes. At that time, since arithmetic processing times are different between processes, start times of communication processing may be different between the processes.

Figure 1:
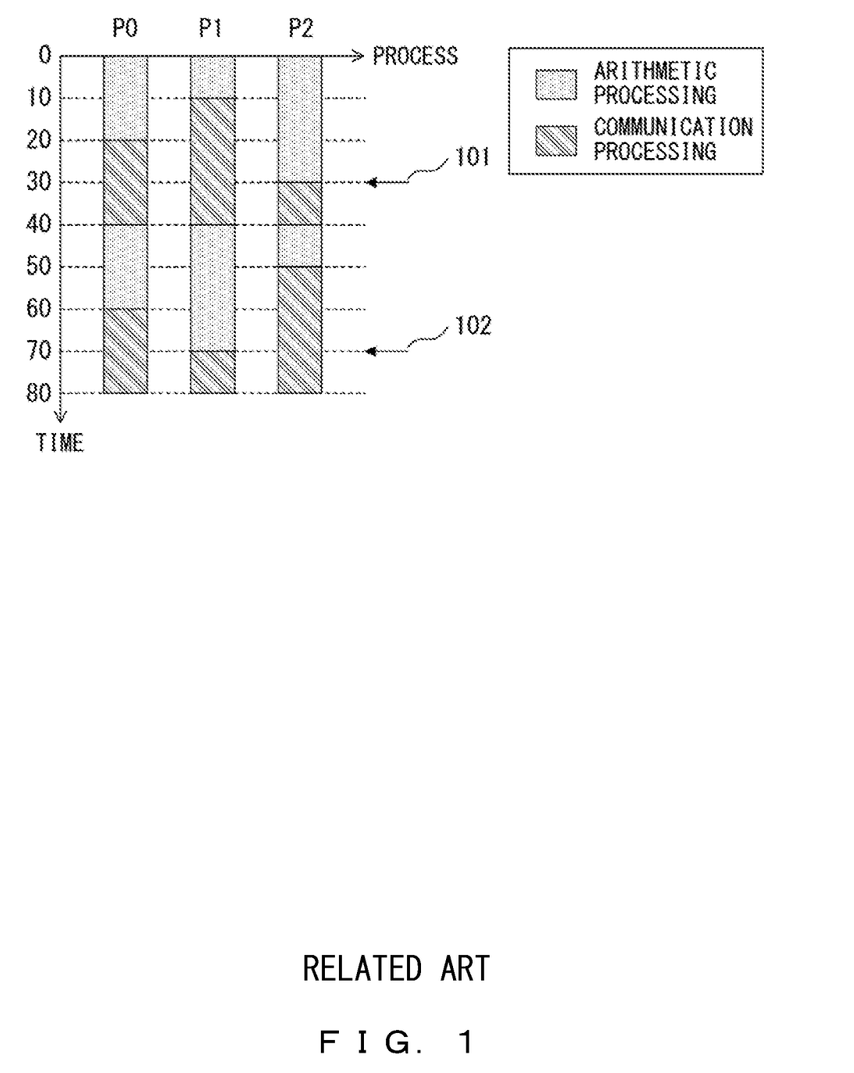
FIG. 1 is a diagram illustrating interprocess communication processing in a parallel computer system.

For example, as illustrated in FIG. 1, when process P0, process P1, and process P2 execute a parallel application program, each of process P0 and process P1, which have completed arithmetic processing earlier, tries communication processing with process P2. However, since process P2 is under arithmetic processing and prevented from starting communication processing, each of process P0 and process P1 waits for the completion of the arithmetic processing of process P2. In this period, since process P0 and process P1 execute neither arithmetic processing nor communication processing, usage efficiency of the parallel computer system is reduced, and a parallel performance is deteriorated.

As a solution to this problem, a method is possible in which the developer of the parallel application program performs code rewriting, or parameter tuning, etc., which equalizes the arithmetic processing time for each process, so that the start times of communication processing are matched between processes.

As a method for confirming whether or not the start times of communication processing are matched between processes, a confirmation method based on the size of the value called a synchronization waiting time is known. The synchronization waiting time is obtained for example as follows:

1. A start time is acquired for each communication processing of each process. This start time can be acquired, for example, as an elapsed time from the execution start of each process;
2. The maximum value of the start times of the plurality of processes is determined for each communication processing; and
3. A difference between the maximum value and the start time of communication processing of each process is determined, differences related to a plurality of pieces of communication processing are accumulated for each process, and the accumulated difference is recorded as the synchronization waiting time.

The synchronization waiting time of each process becomes zero when the start times of all communication processing agree among the processes, and becomes close to the elapsed time taken for execution of the parallel application program as the differences in the start times among the processes become larger. Therefore, as a synchronization waiting time becomes closer to zero, the state can be determined to be more desirable.

In first communication processing in FIG. 1, start times of process P0, process P1, and process P2 are 20, 10, and 30 respectively, and the maximum value of the start times is 30, as indicated by an arrow 101. Differences between the maximum value 30 and the start times of process P0, process P1, and process P2 are 10, 20, and 0, respectively.

In second communication processing, start times of process P0, process P1, and process P2 are 60, 70, and 50 respectively, and the maximum value of the start times is 70, as indicated by an arrow 102. Differences between the maximum value 70 and the start times of process P0, process P1, and process P2 are 10, 0, and 20, respectively.

As a result, if differences related to the first and second communication processing are accumulated, synchronization waiting times of process P0, process P1, and process P2 are 20, 20, and 20, respectively. In this case, the elapsed time taken for execution of the parallel application program is 80, and 20 out of 80 can be interpreted as wasted time for waiting for completion of arithmetic processing of the other process.

In the following description, a parallel application program may be referred to as a parallel application.

The parallel application performance profiling tool of Cray Inc., U.S.A., hooks the collective communication function of MPI in order to determine the synchronization waiting time, and automatically calls up an interprocess synchronization interface (MPI_Barrier function) before a start of communication processing. Then, the parallel application performance profiling tool determines the sum value of the elapsed times of the MPI_Barrier function for each process.

A reduction operation apparatus configured to carry out a reduction operation determining the total sum, the maximum value, the minimum value, etc., of data, targeted at data possessed by a plurality of processes, is also known (See Patent Document 1).

Patent Document 1: Japanese Laid-open Patent Publication No. 2010-122848

SUMMARY

According to an aspect of the embodiments, a communication control device connected to an arithmetic processing device and a main storage device includes an operational circuit.

First sequence information is given by the arithmetic processing device to a first start time when a first process among a plurality of processes included in a program executed by the arithmetic processing device starts a first interprocess communication, and is written in the main storage device. When second sequence information given to a second start time when a second process among the plurality of processes starts a second interprocess communication is newer than the first sequence information, the operational circuit does not carry out an operation using the first start time.

When the second sequence information corresponds to the first sequence information, the operational circuit carries out an operation using the first start time and the second start time, and outputs an operation result.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, the embodiments will be described in detail with reference to the drawings.

When an interprocess synchronization interface is called up in order to determine a synchronization waiting time, as in the case of a parallel application performance profiling tool, since synchronization processing is added to processing of each process, the behavior of a parallel application may be changed greatly.

Figure 2:
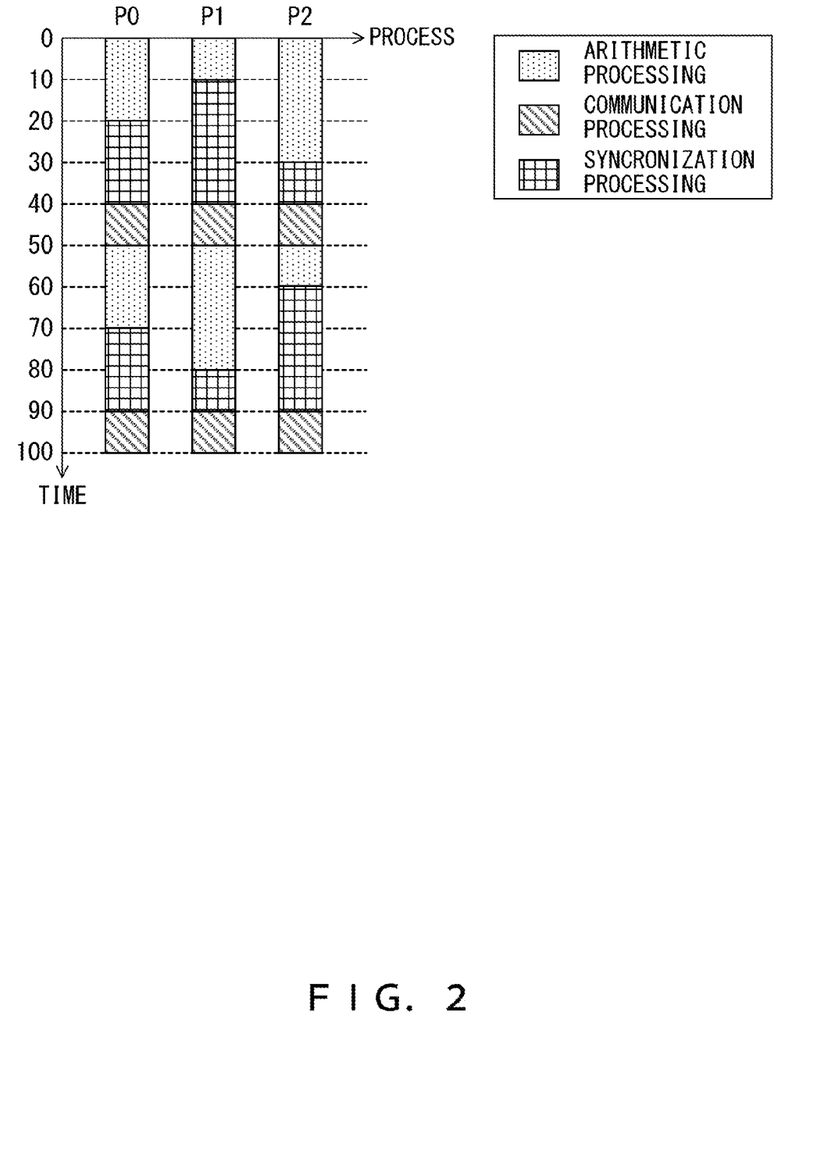
FIG. 2 is a diagram illustrating interprocess communication processing when an interprocess synchronization interface is used.

FIG. 2 illustrates an example for calling up an interprocess synchronization interface by a parallel application performance profiling tool, in the parallel application in FIG. 1. In this case, since synchronization processing for determining the synchronization waiting time is executed after communication processing of each process has been completed, the elapsed time taken for the execution of the parallel application is increased by 25%, from 80 to 100. Although the elapsed time depends on the parallel application, there are many cases in which the elapsed time increases by 10% or more. As a result, it is desirable to determine the maximum value of start times for each communication processing without executing synchronization processing.

In order to determine the maximum value of start times for each communication processing without executing synchronization processing (non-synchronously), a method is considered wherein after each process acquires a start time for each communication processing and writes it in a main storage area, the maximum value is calculated during execution of the parallel application or after execution of it.

First, when the maximum value is calculated after execution of the parallel application, there is a possibility of significantly reducing the main storage area that the parallel application can use, in the parallel application with a long execution time. For example, under the assumption that communication processing is generated at a frequency of once per 1 ms in a parallel application in which 100,000 processes run during one day, if data of a start time of 8 bytes is recorded for each communication processing, about 691 Mbytes of the main storage area for each process is occupied by the data of start times, just before the parallel application is terminated.

In a parallel computer system mounted with a main storage device of 32 G bytes per node, when 16 processes are operated in parallel in each node, the main storage area of about 11 G bytes is occupied with data of start times, which may cause problems in execution of the parallel application. In such a case, it is desirable to calculate the maximum value during execution of the parallel application.

When the maximum value is calculated during execution of the parallel application, it is not necessary to record data of start times of all communication processing, but it is enough to record the accumulated value of differences with respect to the past communication processing as the synchronization waiting time. Therefore, even in a parallel application with a long execution time, the main storage area is not reduced significantly. In this case, a method is considered wherein the start time of communication processing in each process is transmitted and received by using a non-synchronous communication interface of software or hardware during arithmetic processing.

In a method using the non-synchronous communication interface of software, data of a start time can be transmitted and received between processes by a non-blocking communication interface of MPI (MPI_Isend function, MPI_Irecv function, MPI_Wait function, etc.). However, since the calculation of the maximum value is done by software processing of a Central Processing Unit (CPU), the behavior of the parallel application may change due to a consumption of CPU time.

In a method using the non-synchronous communication interface of hardware, each process transfers data of a start time to a network reduction mechanism mounted on a network interface, and instructs it to carry out a maximum value calculation. The network reduction mechanism refers to a hardware mechanism configured to receive data from each process of each node connected to each other through a communication network, carryout a single operation targeting all data, and hold the operation result in each node. Examples of the operations carried out by the network reduction mechanism include calculations for determining the total sum, the maximum value, the minimum value, etc. of data.

For example, after each process transfers the start time of communication processing to the network reduction mechanism at the completion of the communication processing and gives an instruction to carry out the maximum value calculation, each process can read out the maximum value from the network reduction mechanism at the start of the next communication processing. Thus, the network reduction mechanism can calculate the maximum value during arithmetic processing of each process.

Figure 3:
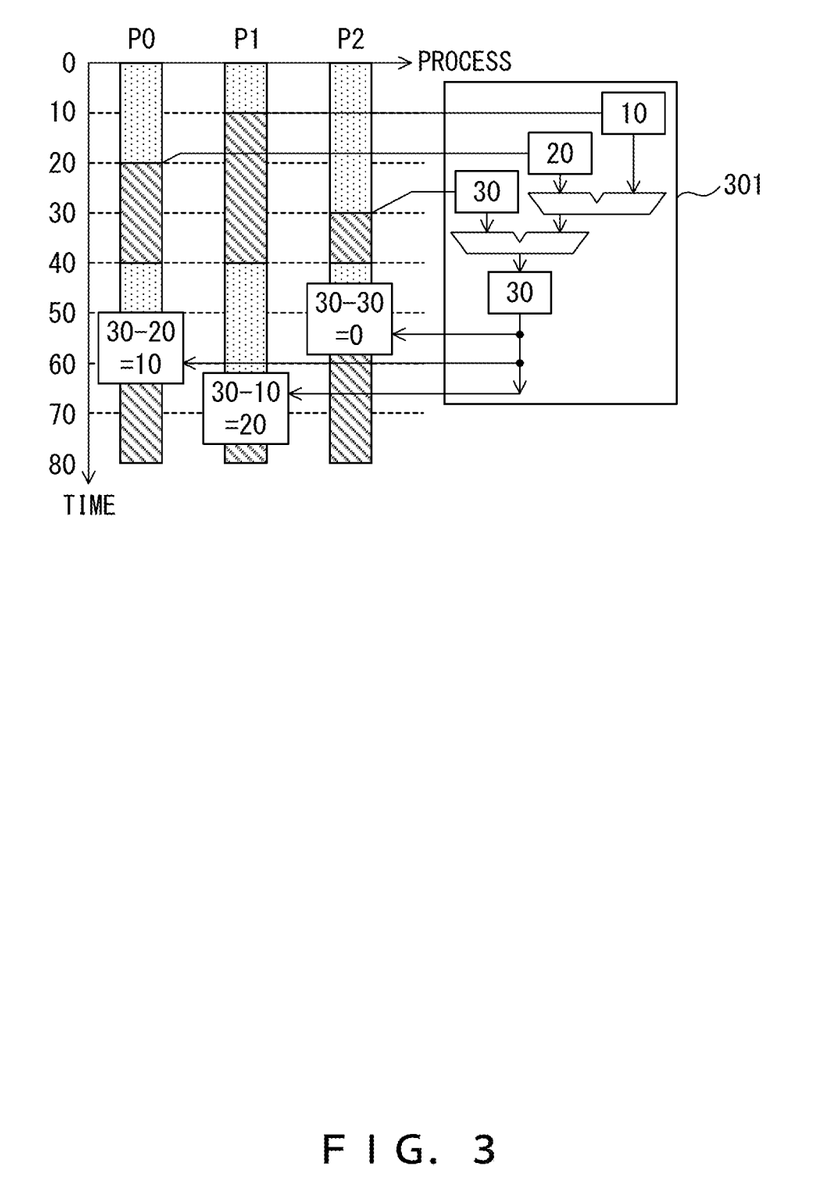
FIG. 3 is a diagram illustrating a network reduction mechanism.

FIG. 3 illustrates an example wherein a network reduction mechanism 301 calculates the maximum value in the parallel application in FIG. 1. In this case, during the second arithmetic processing, the network reduction mechanism 301 calculates the maximum value 30 of the start times of the first communication processing. Then, process P0, process P1, and process P2 determine the differences 10, 20, and 0 between the maximum value 30 and the start times 20, 10 and 30 of the first communication processing, respectively, at the start of the second communication processing.

Here, when the arithmetic processing time between a certain communication processing and the next communication processing is very short, although this is rare, the maximum value calculation carried out by the network reduction mechanism may have not been completed. When the network reduction mechanism can only carry out a single maximum value calculation simultaneously, since each process is prevented from giving an instruction to carryout the subsequent maximum value calculation until the preceding maximum value calculation has been completed, the behavior of the parallel application changes.

Several methods are considered in order to avoid the change in the behavior of a parallel application when using a network reduction mechanism. Examples of the methods include a method wherein the network reduction mechanism skips the instruction to carry out the subsequent maximum value calculation until the preceding maximum value operation has been completed. However, since operations carried out by the network reduction mechanism are not always completed at the same time among the processes, a situation in which the skip frequency is different for each process may occur. If the subsequent maximum value calculation is carried out under such a circumstance, the maximum value of the start times of a plurality of different pieces of communication processing is calculated instead of the maximum value of the start times of one piece of communication processing.

Other examples of the methods include a method of mounting a plurality of network reduction mechanisms in a network interface and using the network reduction mechanisms in order. However, an increase in the size of hardware is extremely large. Since the problem in which the maximum value calculation carried out by the network reduction mechanism has not been completed occurs infrequently, it is not practical to incur a large hardware cost in order to solve the problem.

Such a problem occurs not only in the case when the maximum value of the times when interprocess communication is initiated is calculated but also in the case when another operation using the times when the interprocess communication is initiated is carried out, in the parallel application.

Figure 4:
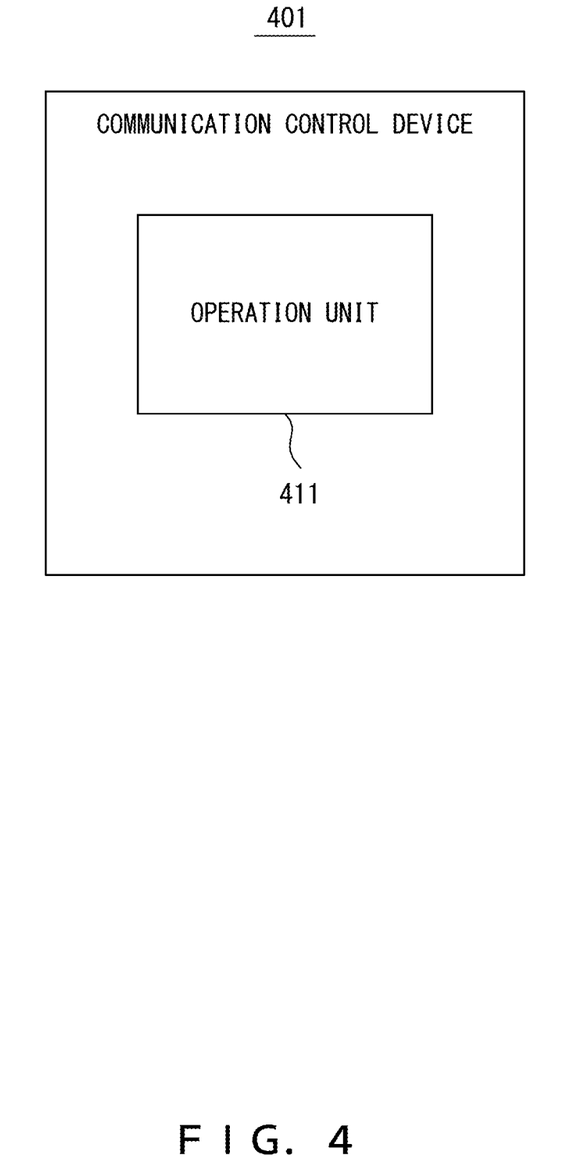
FIG. 4 is a configuration diagram of a first communication control device.

FIG. 4 illustrates a configuration example of a communication control device of the embodiments. The communication control device 401 in FIG. 4 is provided inside an information processing apparatus (computer) corresponding to each node of the parallel computer system, and includes an operation unit 411 (operational circuit).

An arithmetic processing device in the information processing apparatus executes a program, and gives first sequence information to a first start time when a first process among a plurality of processes included in the program starts a first interprocess communication. Then, the arithmetic processing device writes the first start time and the first sequence information in the main storage device in the information processing apparatus.

When second sequence information given to a second start time when a second process among the plurality of processes starts a second interprocess communication is newer than the first sequence information, the operation unit 411 in the communication control device 401 does not carry out an operation using the first start time. On the other hand, when the second sequence information corresponds to the first sequence information, the operation unit 411 carries out an operation using the first start time and the second start time and outputs the operation result.

Sequence information indicates the order of communication processing executed by each process, and the same sequence information is given to communication processing of the same order among the plurality of processes. For example, the sequence information given to the first communication processing executed by the second process is the same as the sequence information given to the first communication processing executed by the first process. The sequence information given to the second communication processing executed by the second process is the same as the sequence information given to the second communication processing executed by the first process.

By comparing the sequence information given to each start time between the first process and the second process, it can be determined whether or not the two start times are the start times of communication processing of the same order.

When the second sequence information given to the second start time is newer than the first sequence information given to the first start time, the operation unit 411 does not carry out an operation using the first start time. Therefore, the first process can successively instruct the operation unit 411 to carry out an operation using the latest start time, without waiting for the completion of the operation using the old start time. As a result, during the execution of the parallel application, an operation using a start time of an interprocess communication can be carried out, without changing the behavior of the parallel application.

Figure 5:
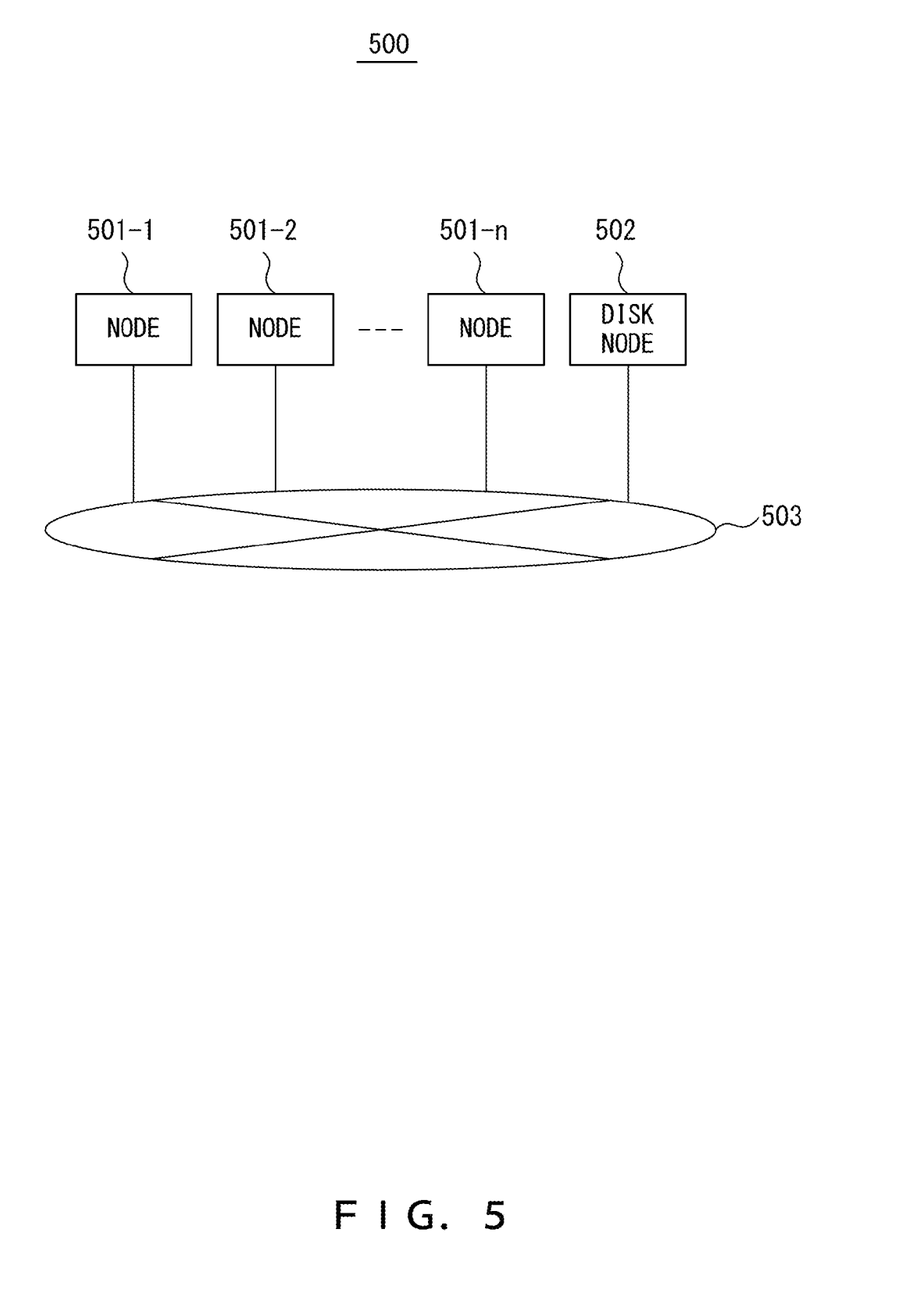
FIG. 5 is a configuration diagram of a parallel computer system.

FIG. 5 illustrates a configuration example of the parallel computer system of the embodiments. The parallel computer system 500 in FIG. 5 includes n (n is an integer of one or more) calculation nodes of a node 501-1 to a node 501-$n$, and a disk node 502. The nodes 501-1 to 501-$n$ and the disk node 502 are connected to each other through a communication network 503.

Figure 6:
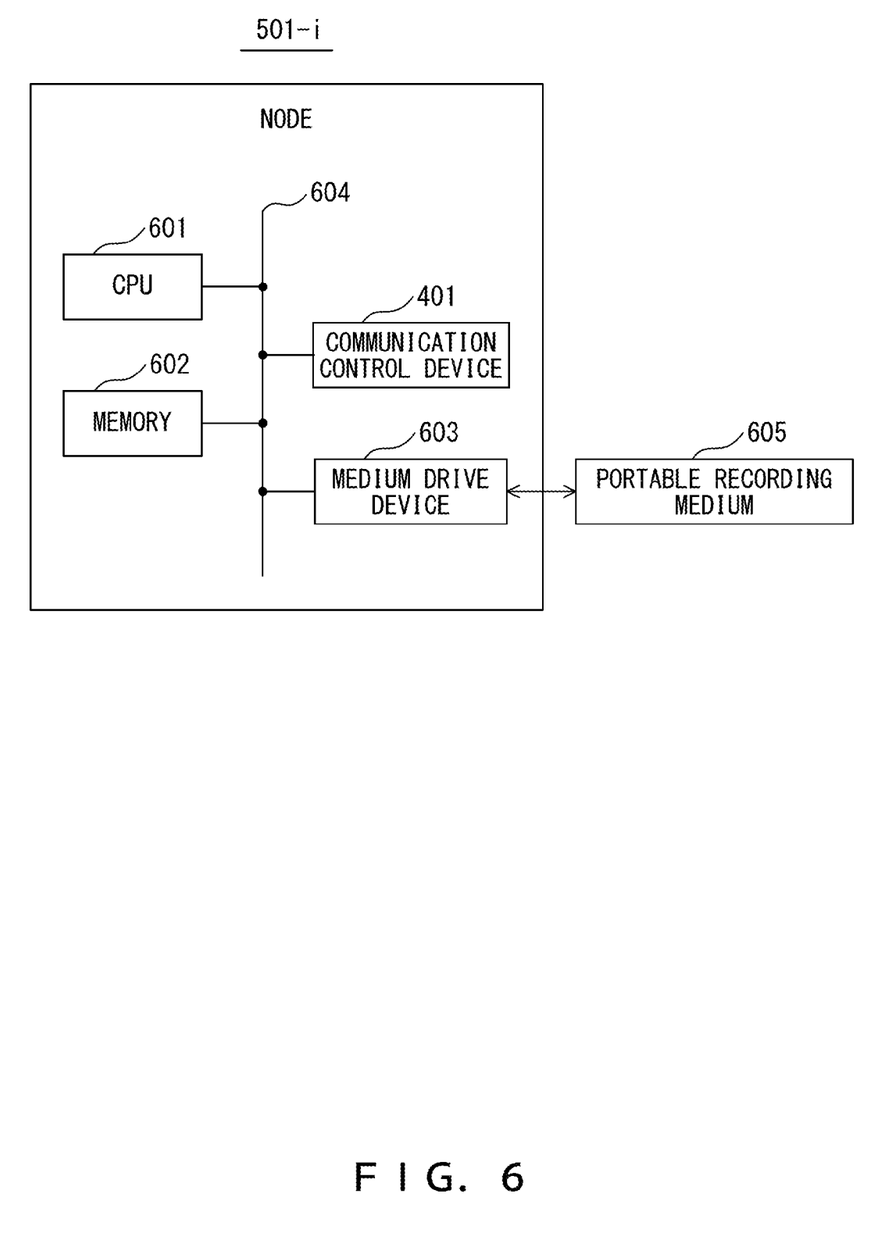
FIG. 6 is a configuration diagram of a node.

FIG. 6 illustrates a configuration example of the information processing apparatus corresponding to the node 501-$i$ (i=1 to n) in FIG. 5. The node 501-$i$ in FIG. 6 includes a CPU 601, a memory 602, a medium drive device 603, and the communication control device 401. The CPU 601, the memory 602, the medium drive device 603, and the communication control device 401 are connected to each other through a bus 604.

The memory 602 corresponds to the main storage device. The memory 602 is a semiconductor memory such as a Read Only Memory (ROM) or a Random Access Memory (RAM), and stores the parallel application program and data used for its processing.

The CPU 601 corresponds to the arithmetic processing device (processor), and can include a memory controller and a network interface controller. The CPU 601, for example, executes the parallel application program using the memory 602. The CPU 601 can also execute programs of the operating system (OS), and a network interface driver, etc.

The medium drive device 603 drives a portable recording medium 605, and accesses its recording content. The portable recording medium 605 may be a Compact Disk Read Only Memory (CD-ROM), a Digital Versatile Disk (DVD), a Universal Serial Bus (USB) memory, or the like. A user or an operator can store the parallel application program and data in the portable recording medium 605, and can use them by loading them into the memory 602.

The communication control device 401 is a network interface connected to the communication network 503 in FIG. 5 and communicates with another node. The node 501-*i* receives the parallel application program and data from a device outside the parallel computer system via the communication control device 401, and can use them by loading them into the memory 602.

The node 501-*i* does not need to include all the constituent elements in FIG. 6, and can omit some of the constituent elements according to use and conditions. For example, the medium drive device 603 can be omitted when the portable recording medium 605 is not used.

The disk node 502 in FIG. 5, for example, has a configuration obtained by adding a disk device to the configuration of the node 501-*i* in FIG. 6. The disk device is, for example, a magnetic disk device, an optical disk device, a magneto-optical disk device, etc., or may be a hard disk drive. The disk device can store data used for processing of the parallel application program.

The nodes 501-1 to 501-*n*, for example, execute the parallel application using data stored in the disk node 502. At that time, one or more processes are created in each node, the plurality of processes in the nodes 501-1 to 501-*n* are parallelized by the MPI, and group communication targeting at all the processes is repeated.

When the disk device is provided in each of the nodes 501-1 to 501-*n*, the disk node 502 may be omitted.

Figure 7:
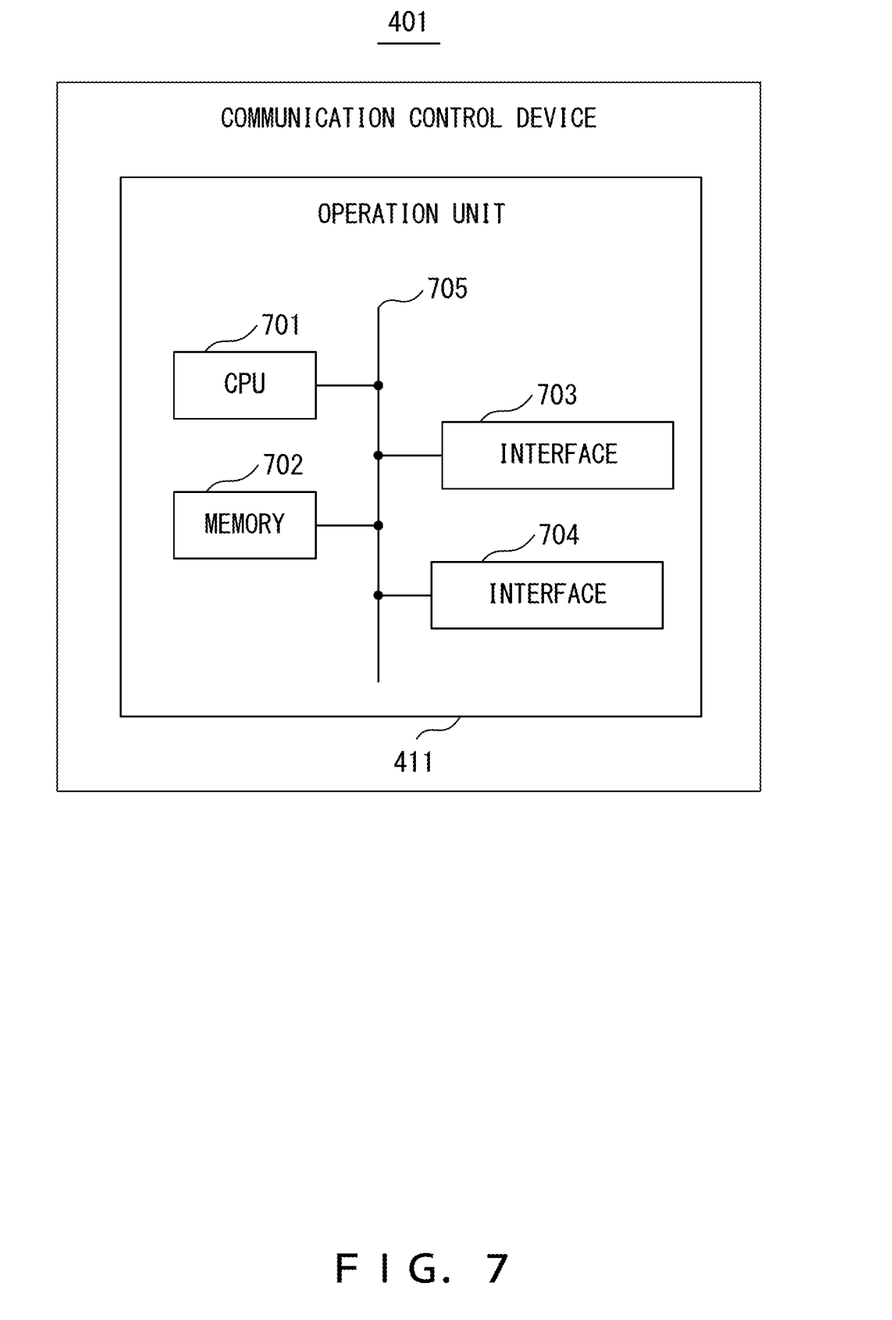
FIG. 7 is a configuration diagram of a second communication control device.

FIG. 7 illustrates a configuration example of the operation unit 411 in the communication control device 401 in FIG. 6. The operation unit 411 in FIG. 7 includes a CPU 701, a memory 702, an interface 703, and an interface 704. The CPU 701, the memory 702, the interface 703, and the interface 704 are connected to each other through a bus 705.

The CPU 701 corresponds to the arithmetic processing device (processor), and the memory 702 corresponds to the main storage device. The memory 702 is a semiconductor memory such as a ROM, a RAM, etc., and stores a control program and data. Data stored in the memory 702 includes data transferred from the CPU 601 in FIG. 6, and data received from another node, etc. The CPU 701, for example, carries out the operation of the network reduction mechanism by executing the control program using the memory 702, and writes the operation result in the memory 702.

A user or an operator can store the control program and data in the portable recording medium 605 in FIG. 6, load them in the memory 702, and use them. Thus, the computer-readable recording medium configured to store the control program and data is a physical (non-transitory) recording medium such as the memory 702 or the portable recording medium 605.

The interface 703 is connected to the bus 604 in FIG. 6 and communicates with the CPU 601, and the interface 704 is connected to the communication network 503 in FIG. 5 and communicates with another node. The partial operation result of the network reduction mechanism is transmitted and received between nodes, so that the operation is made to be efficient. The operation unit 411 can receive the control program and data from a device outside the parallel computer system via the interface 703 or the interface 704, load them into the memory 702, and use them.

The configuration of the operation unit 411 is not limited to the configuration in FIG. 7, and part or all of the processing can be implemented by wired logic.

Figure 8:
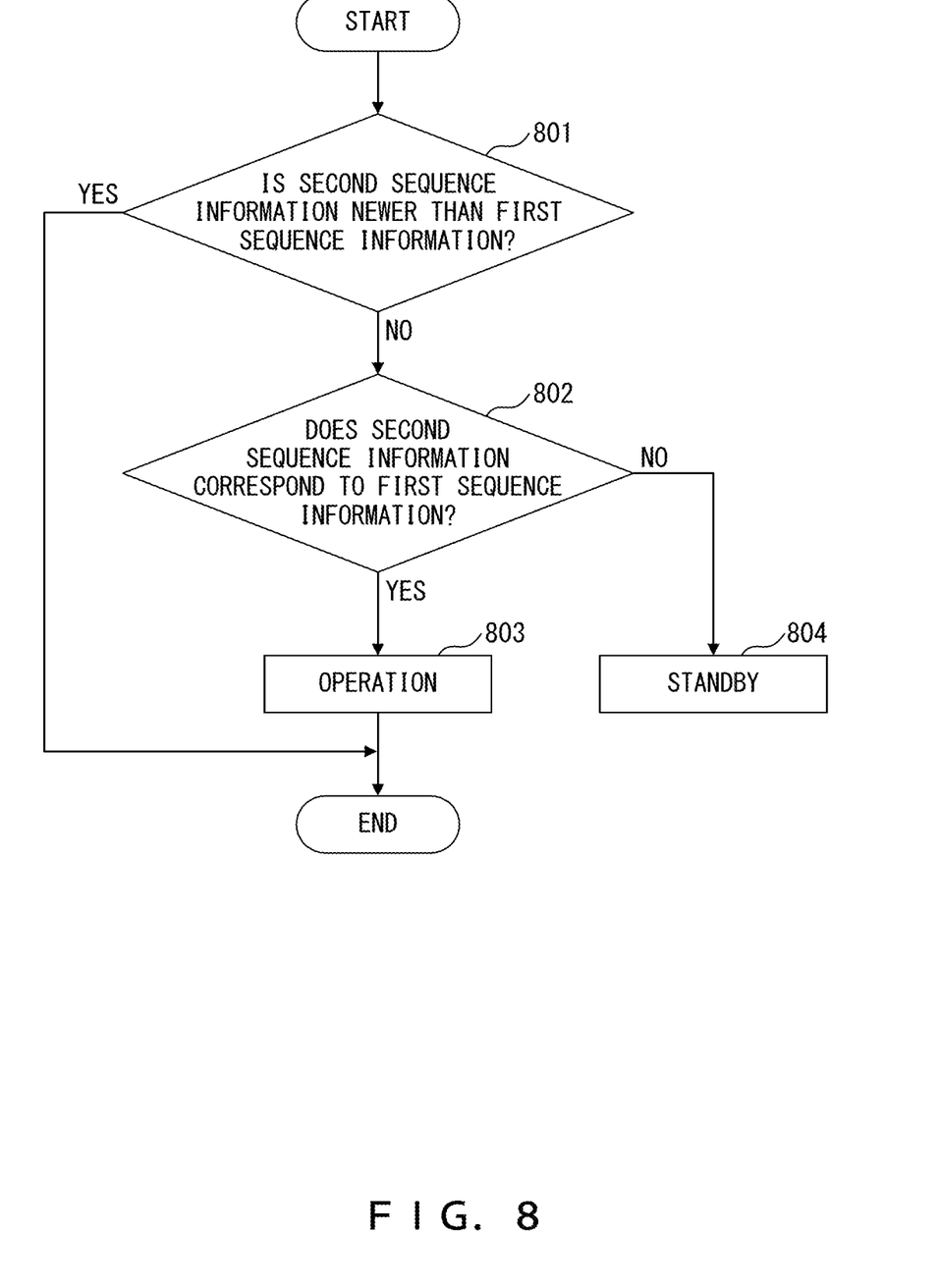
FIG. 8 is a flowchart of arithmetic processing using start times of interprocess communication.

FIG. 8 is a flowchart illustrating an example of arithmetic processing that is executed in the node 501-1 and that uses the start times of interprocess communication. In this example, the first process is a process created in the node 501-1 among the plurality of processes of the parallel application. The second process is a process created in the node 501-1 or a process created in any of the nodes 501-2 to 501-*n*, among the plurality of processes of the parallel application.

The CPU 601 in the node 501-1 gives the first sequence information to the first start time when the first process starts the first interprocess communication. Then, the CPU 601 writes the first start time and the first sequence information in the memory 602 in the node 501-1, and transfers the first start time and the first sequence information to the memory 702 in the operation unit 411. The communication control device 401 in the node 501-1 transmits the first start time and the first sequence information to the nodes 501-2 to 501-*n*.

When the second process is created in the node 501-1, the CPU 601 in the node 501-1 gives the second sequence information to the second start time when the second process starts the second interprocess communication. Then, the CPU 601 writes the second start time and the second sequence information in the memory 602 in the node 501-1, and transfers the second start time and the second sequence information to the memory 702 in the operation unit 411. The communication control device 401 in the node 501-1 transmits the second start time and the second sequence information to the nodes 501-2 to 501-*n*.

When the second process is created in the node 501-2, the CPU 601 in the node 501-2 gives the second sequence information to the second start time when the second process starts the second interprocess communication. Then, the CPU 601 writes the second start time and the second sequence information in the memory 602 in the node 501-2, and transfers the second start time and the second sequence information to the memory 702 in the operation unit 411. The communication control device 401 in the node 501-2 transmits the second start time and the second sequence information to the node 501-1 and the nodes 501-3 to 501-*n*.

Similarly, each CPU 601 in the nodes 501-3 to 501-*n* gives the sequence information to the start time when each process starts an interprocess communication. Then, the CPU 601 writes the start time and the sequence information in the memory 602, and transfers the start time and the sequence information to the memory 702 in the operation unit 411. The communication control device 401 in each of the nodes 501-3 to 501-*n* transmits the start time and the sequence information to the other nodes.

In the node 501-1, the CPU 701 in the operation unit 411 checks whether or not the second sequence information given to the second start time is newer than the first sequence information (step 801).

When the second sequence information is newer than the first sequence information (step 801, YES), the CPU 701 does not carry out an operation using the first start time. On the other hand, when the check result in step 801 is NO, the CPU 701 checks whether or not the second sequence information corresponds to the first sequence information (step 802).

When the second sequence information corresponds to the first sequence information (step 802, YES), the CPU 701 carries out an operation using at least the first start time and the second start time, and writes the operation result in the memory 702 (step 803).

On the other hand, when the check result in step 802 is NO, the CPU 701 does not carry out an operation using the second start time, and waits until it has received a third start time when the second process starts a third interprocess communication and third sequence information (step 804). Then, when the third sequence information corresponds to the first sequence information, the CPU 701 carries out an operation using at least the first start time and the third start time, and writes the operation result in the memory 702.

The operation unit 411 of each of the nodes 501-2 to 501-n can execute similar arithmetic processing as that of the operation unit 411 of the node 501-1.

Figure 9:
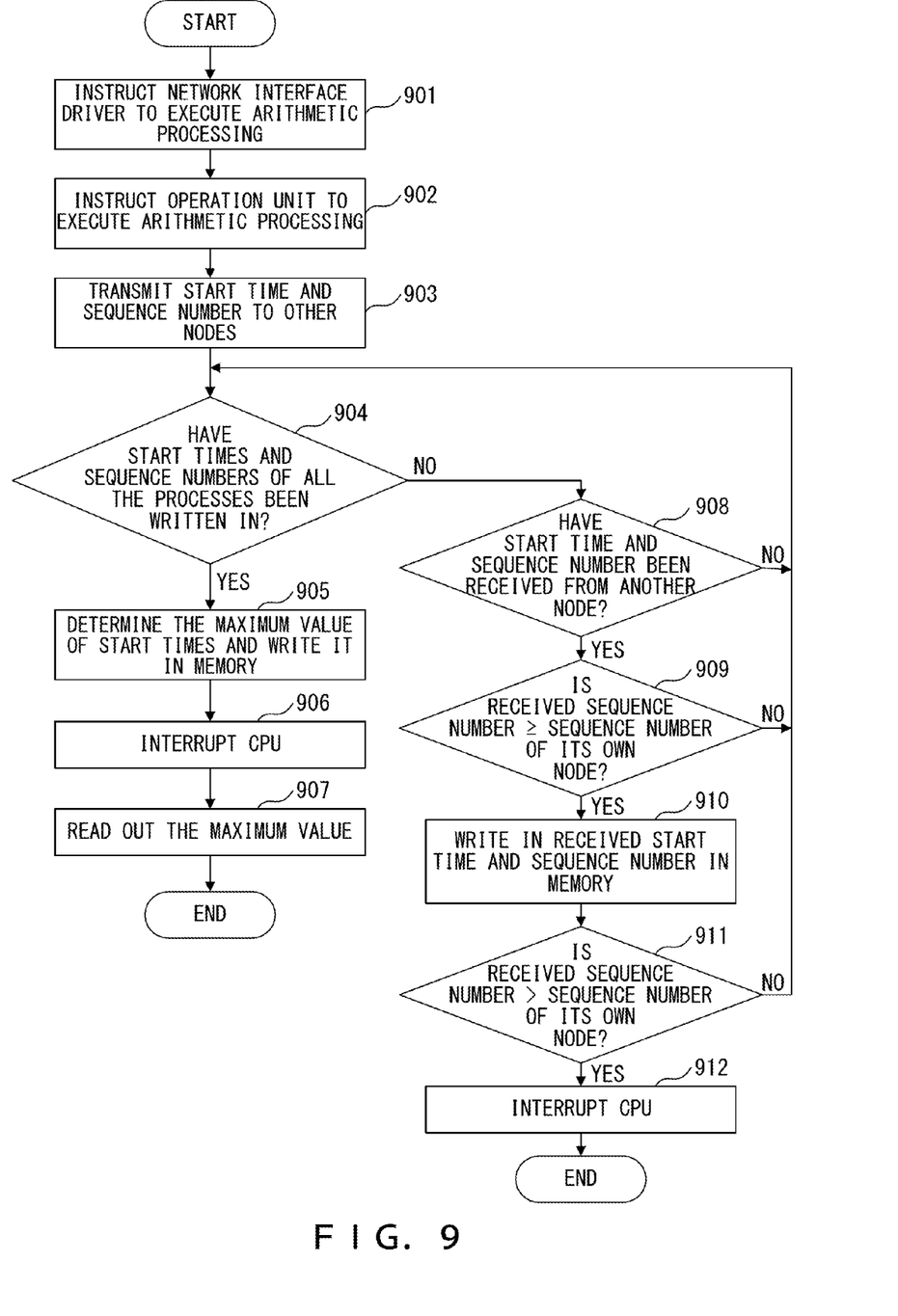
FIG. 9 is a flowchart illustrating a first specific example of arithmetic processing.

FIG. 9 is a flowchart illustrating a specific example of the arithmetic processing in FIG. 8 executed when one process operates in each of the nodes 501-1 to 501-n in FIG. 5.

As the sequence information, for example, sequence numbers which are non-negative integers in ascending order are used. The sequence numbers are managed by the network interface driver, and are reset to zero at the start of the parallel application. The memory 602 in each node 501-i (i=1 to n) stores the start time T(i) when a process starts an interprocess communication, and the sequence number S(i) of the process.

The CPU 601 in each node 501-i operates a process by executing the parallel application, and operates the network interface driver by executing the program of the network interface driver.

When a process in the node 501-i starts an interprocess communication, the process instructs the network interface driver to execute arithmetic processing (step 901). Next, the CPU 601 operates as the network interface driver and reads out the start time T(i) and the sequence information S(i) from the memory 602 (step 902). Then, the CPU 601 writes the read-out start time T(i) and sequence information S(i) in the memory 702 in the operation unit 411, and instructs the CPU 701 in the operation unit 411 to execute arithmetic processing. Then, the CPU 601 increments the sequence number S(i) in the memory 602 by one.

Next, the CPU 701 transmits the start time T(i) and the sequence number S(i) written in the memory 702 to other nodes 501-j (1≤j≤n, j≠i) (step 903). Then, the CPU 701 checks whether or not the start times and the sequence numbers of all the processes in the parallel application are written in the memory 702 (step 904).

When the start time and the sequence number of any process is not written in (step 904, NO), the CPU 701 checks whether or not the start time and the sequence number has been received from another node (step 908).

When the start time and the sequence number has not been received from another node (step 908, NO), the CPU 701 repeats the processing in step 904 and thereafter. On the other hand, when the start time T(k) and the sequence number S(k) is received from another node 501-k (1≤k≤n, k≠i) (step 908, YES), the CPU 701 compares the received sequence number S(k) with the sequence number S(i) (step 909).

When the received sequence number S(k) is smaller than the sequence number S(i) (step 909, NO), the CPU 701 repeats the processing in step 904 and thereafter. On the other hand, when the received sequence number S(k) is equal to or greater than the sequence number S(i) (step 909, YES), the CPU 701 writes the received start time T(k) and sequence number S(k) in the memory 702 (step 910). Then, the CPU 701 again compares the received sequence number S(k) and the sequence number S(i) (step 911).

When the received sequence number S(k) agrees with the sequence number S(i) (step 911, NO), the CPU 701 repeats the processing in step 904 and thereafter. Thus, when the start times and the sequence numbers of all the processes are written in the memory 702 (step 904, YES), the CPU 701 determines the maximum value of the start times of all the processes, and writes it in the memory 702 (step 905).

Next, the CPU 701 interrupts the CPU 601 (step 906), and the CPU 601 activates the network interface driver. Then, the CPU 601 reads out the maximum value of the start times from the memory 702, writes it in the memory 602, and initializes the memory 702 (step 907). As a result, the start times and the sequence numbers of all the processes in the memory 702 are deleted.

On the other hand, when the received sequence number S(k) is larger than the sequence number S(i) (step 911, YES), the CPU 701 interrupts the CPU 601 and notifies it that the CPU 701 should cancel the instructed arithmetic processing (step 912). Due to this notification, the CPU 601 cancels the arithmetic processing which the process instructs the network interface driver to execute, without initializing the memory 702. Thereafter, when the process instructs the network interface driver to execute the next arithmetic processing, the CPU 601 again starts the processing in step 901 and thereafter.

Figure 10:
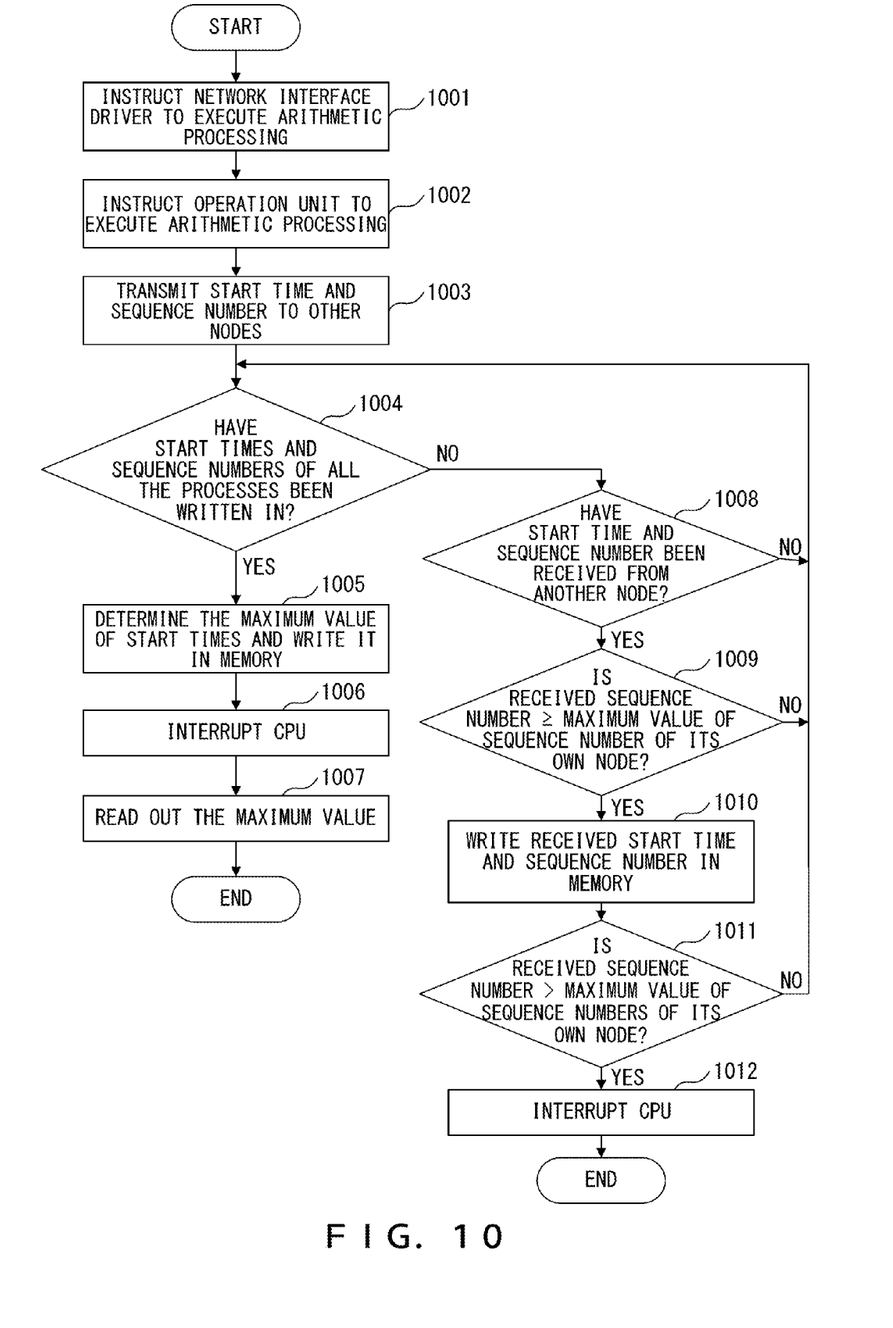
FIG. 10 is a flowchart illustrating a second specific example of arithmetic processing.

FIG. 10 is a flowchart illustrating a specific example of the arithmetic processing in FIG. 8 executed when a plurality of processes operate in each node of the nodes 501-1 to 501-n in FIG. 5.

As the sequence information, for example, sequence numbers which are non-negative integers in ascending order are used. The sequence numbers are managed by the network interface driver, and are reset to zero at the start of the parallel application. The total number of the processes operating in the nodes 501-1 to 501-n is set to be p and identification information of the m-th process is set to be P(m) (m=1 to p). The memory 602 in each node 501-i (i=1 to n) stores the start time T(m) when each process in the node 501-i starts an interprocess communication, and the sequence number S(m) of the process.

When the process P(r) among the plurality of processes in the node 501-i starts an interprocess communication, the process P(r) instructs the network interface driver to execute arithmetic processing (step 1001). Next, the CPU 601 operates as the network interface driver, and reads out the start time T(r) and the sequence number S(r) of the process P(r) from the memory 602 (step 1002). Next, the CPU 601 writes the read-out start time T(r) and the sequence number S(r) in the memory 702 in the operation unit 411, and instructs the CPU 701 in the operation unit 411 to execute arithmetic processing. Then, the CPU 601 increments the sequence number S(r) in the memory 602 by one.

Next, the CPU 701 transmits the start time T(r) and the sequence number S(r) written in the memory 702 to other nodes 501-j (1≤j≤n, j≠i) (step 1003).

Thereafter, when another process P(x) in the node 501-i starts an interprocess communication, the process P(x) instructs the network interface driver to execute arithmetic processing, similarly to step 1001. The CPU 601 writes the start time T(x) and the sequence number S(x) of the process P(x) in the memory 702, and increments the sequence number S(x) in the memory 602 by one, similarly to step 1002. Then, the CPU 701 transmits the start time T(x) and the sequence number S(x) written in the memory 702 to other nodes 501-j (1≤j≤n, j≠i), similarly to step 1003.

Next, the CPU 701 checks whether or not the start times and the sequence numbers of all the processes in the parallel application are written in the memory 702 (step 1004). When the start time and the sequence number of any process is not written in (step 1004, NO), the CPU 701 checks whether or not the start time and the sequence number have been received from another node (step 1008).

When the start time and the sequence number have not been received from another node (step 1008, NO), the CPU 701 repeats the processing in step 1004 and thereafter.

During this period, when another process P(y) in the node 501-*i* starts an interprocess communication, the process P(y) instructs the network interface driver to execute arithmetic processing, similarly to step 1001. The CPU 601 writes the start time T(y) and the sequence number S(y) of the process P(y) in the memory 702, and increments the sequence number S(y) in the memory 602 by one, similarly to step 1002. Then, the CPU 701 transmits the start time T(y) and the sequence number S(y) written in the memory 702 to other nodes 501-*j* (1≤j≤n, j≠i), similarly to step 1003.

On the other hand, when the start time T(q) and the sequence number S(q) have been received from another node 501-*k* (1≤k≤n, k≠i) (step 1008, YES), the CPU 701 executes the processing in step 1009.

In step 1009, the CPU 701 determines the maximum value of the sequence numbers corresponding to one or more processes in the node 501-*i* from among the sequence numbers written in the memory 702. Then, the CPU 701 compares the received sequence number S(q) with the maximum value of the sequence numbers. When the received sequence number S(q) is smaller than the maximum value of the sequence numbers (step 1009, NO), the CPU 701 repeats the processing in step 1004 and thereafter.

On the other hand, when the received sequence number S(q) is equal to or greater than the maximum value of the sequence numbers (step 1009, YES), the CPU 701 writes the received start time T(q) and sequence number S(q) in the memory 702 (step 1010). Then, the CPU 701 again compares the received sequence number S(q) and the maximum value of the sequence numbers (step 1011).

When the received sequence number S(q) agrees with the maximum value of the sequence numbers (step 1011, NO), the CPU 701 repeats the processing in step 1004 and thereafter. When the start times and the sequence numbers of all the processes in the node 501-*i* are written in the memory 702 and when these sequence numbers agree with the sequence number S(r), the maximum value of the sequence numbers determined in step 1009 is S(r).

When the start times and the sequence numbers of all the processes of the parallel application are written in the memory 702 (step 1004, YES), the CPU 701 determines the maximum value of the start times of all the processes, and writes it in the memory 702 (step 1005).

Next, the CPU 701 interrupts the CPU 601 (step 1006), and the CPU 601 activates the network interface driver. Then, the CPU 601 reads out the maximum value of the start times from the memory 702, writes it in the memory 602, and initializes the memory 702 (step 1007). As a result, the start times and the sequence numbers of all the processes in the memory 702 are deleted.

On the other hand, when the received sequence number S(q) is larger than the maximum number of the sequence numbers (step 1011, YES), the CPU 701 interrupts the CPU 601 and notifies it that the CPU 701 should cancel the instructed arithmetic processing (step 1012). Due to this notification, the CPU 601 cancels the arithmetic processing which the process P(r) instructs the network interface driver to execute, without initializing the memory 702. Thereafter, when the process P(r) or another process instructs the network interface driver to execute the next arithmetic processing, the CPU 601 again starts the processing in step 1001 and thereafter.

According to the arithmetic processing in FIG. 9 or FIG. 10, the operation unit 411 does not carryout an operation using start times until the start times of all the processes having the latest sequence number have been written in the memory 702. When the sequence number of the process in the node 501-*i* is incremented and becomes the same as the received sequence number, arithmetic processing using the start times of all the processes having that sequence number is executed.

Thus, arithmetic processing is always executed for the start time having the latest sequence number. Each process can successively instruct the operation unit 411 to execute arithmetic processing using the latest start time, without waiting for the completion of the arithmetic processing using an old start time. As a result, an operation using a start time of an interprocess communication can be carried out without changing the behavior of the parallel application.

In addition, it is enough to provide one operation unit 411 in the communication control device 401, and it is not necessary to provide a plurality of network reduction mechanisms, so that an increase in the size of hardware can be suppressed. Particularly in a large-scale parallel computer system, a significant effect due to the arithmetic processing in FIG. 9 or FIG. 10 can be expected.

Configurations of the communication control device 401 in FIG. 4 and FIG. 7, the parallel computer system 500 in FIG. 5, and the node 501-*i* in FIG. 6 are merely one example, and some of the constituent elements may be omitted or changed according to use and conditions of the parallel computer system.

The flowcharts in FIG. 8 to FIG. 10 are merely one example, and some of the processes may be omitted or changed according to the configuration and conditions of the parallel computer system. For example, in arithmetic processing in FIG. 9 or FIG. 10, information which indicates the order of communication processing and which is other than the sequence number can be used as the sequence information. In addition, in step 905 in FIG. 9 or step 1005 in FIG. 10, the CPU 701 can determine other values such as the total sum of the start times and the minimum value of the start times, instead of determining the maximum value of the start times.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control device connected to an arithmetic processing device and a main storage device, the communication control device comprising:

an operational circuit configured not to carry out an operation using a first start time when a first process among a plurality of processes included in a program executed by the arithmetic processing device starts a first interprocess communication, first sequence information being given to the first start time and written in the main storage device by the arithmetic processing device, when second sequence information given to a second start time when a second process among the plurality of processes starts a second interprocess communication is newer than the first sequence information, and configured to carry out an operation using the first start time and the second start time and to output an operation result when the second sequence information corresponds to the first sequence information.

2. The communication control device according to claim 1, wherein when the first sequence information is newer than the second sequence information and when third sequence information given to a third start time when the second process starts a third interprocess communication corresponds to the first sequence information, the operational circuit does not carry out an operation using the second start time, but carries out an operation using the first start time and the third start time and outputs an operation result.

3. The communication control device according to claim 1, wherein, the arithmetic processing device executes the first process, and an arithmetic processing device included in an information processing apparatus connected via the communication control device executes the second process.

4. The communication control device according to claim 3, wherein the first sequence information corresponds to fourth sequence information given to a fourth start time when a fourth process among the plurality of processes starts a fourth interprocess communication, the fourth process being executed by the arithmetic processing device which executes the first process, or the first sequence information is newer than the fourth sequence information.

5. The communication control device according to claim 1, wherein the arithmetic processing device executes the first process and the second process.

6. An information processing apparatus comprising:
an arithmetic processing device configured to execute a program, and to give first sequence information to a first start time when a first process among a plurality of processes included in the program starts a first interprocess communication;
a main storage device configured to store the first start time and the first sequence information; and
a communication control device configured not to carry out an operation using the first start time when second sequence information given to a second start time when a second process among the plurality of processes starts a second interprocess communication is newer than the first sequence information, and configured to carry out an operation using the first start time and the second start time and to output an operation result when the second sequence information corresponds to the first sequence information.

7. A parallel computer system including a plurality of information processing apparatuses, wherein
at least one information processing apparatus among the plurality of information processing apparatuses includes:
an arithmetic processing device configured to execute a program, and to give first sequence information to a first start time when a first process among a plurality of processes included in the program starts a first interprocess communication;
a main storage device configured to store the first start time and the first sequence information; and
a communication control device configured not to carry out an operation using the first start time when second sequence information given to a second start time when a second process among the plurality of processes starts a second interprocess communication is newer than the first sequence information, and configured to carry out an operation using the first start time and the second start time and to output an operation result when the second sequence information corresponds to the first sequence information.

8. A non-transitory computer-readable recording medium having stored therein a control program for an information processing apparatus including a first arithmetic processing device, a communication control device, and a main storage device, the control program causing a second arithmetic processing device in the communication control device to execute a process comprising:
not carrying out an operation using a first start time when a first process among a plurality of processes included in a program executed by the first arithmetic processing device starts a first interprocess communication, first sequence information being given to the first start time and written in the main storage device by the first arithmetic processing device, when second sequence information given to a second start time when a second process among a plurality of processes starts a second interprocess communication is newer than the first sequence information, but carrying out an operation using the first start time and the second start time and outputting an operation result when the second sequence information corresponds to the first sequence information.

9. A control method for a parallel computer system including a plurality of information processing apparatuses, the control method comprising:
executing a program by at least one information processing apparatus among the plurality of information processing apparatuses:
giving first sequence information to a first start time by the at least one information processing apparatus when a first process among a plurality of processes included in the program starts a first interprocess communication; and
not carrying out an operation using the first start time by the at least one information processing apparatus when second sequence information given to a second start time when a second process among the plurality of processes starts a second interprocess communication is newer than the first sequence information, but carrying out an operation using the first start time and the second start time and outputting an operation result by the at least one information processing apparatus when the second sequence information corresponds to the first sequence information.

* * * * *